June 16, 1925.   1,542,466

W. MAY

BEET HARVESTER

Filed March 1, 1924   4 Sheets-Sheet 1

June 16, 1925.
W. MAY
BEET HARVESTER
Filed March 1, 1924  4 Sheets-Sheet 4
1,542,466
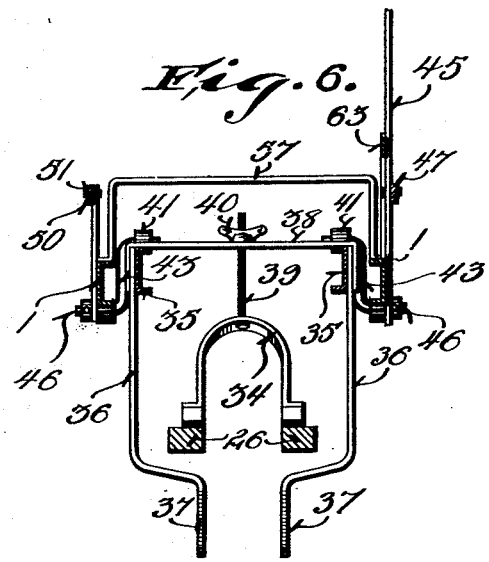
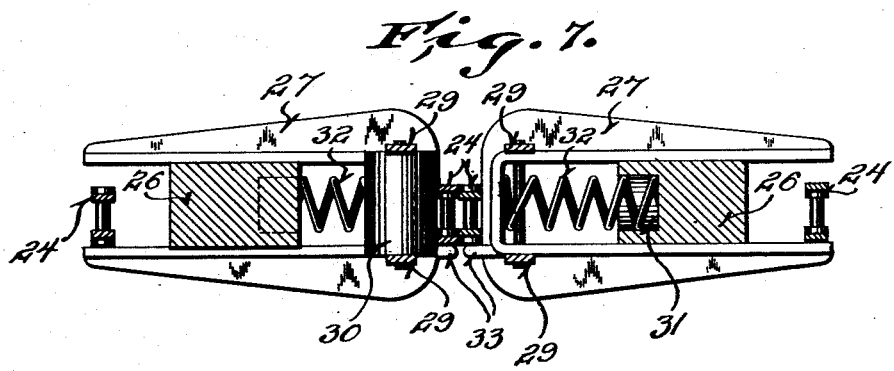

Patented June 16, 1925.

1,542,466

UNITED STATES PATENT OFFICE.

WILLIAM MAY, OF BELGIUM, WISCONSIN.

BEET HARVESTER.

Application filed March 1, 1924. Serial No. 696,289.

*To all whom it may concern:*

Be it known that I, WILLIAM MAY, a citizen of the United States, and resident of Belgium, in the county of Ozaukee and State of Wisconsin, have invented certain new and useful Improvements in Beet Harvesters; and I do hereby declare that the following is a full, clear, and exact description thereof.

This invention relates to beet harvesters.

Objects of this invention are to provide a beet harvester in which beet elevating means are adjustably associated with beet digging means and are adapted to be elevated or lowered, simultaneously, with the corresponding movements of the beet digging means.

Further objects are to provide a beet harvester which is equipped with beet elevating means, in which individual sections of the beet elevating mechanism are adapted for individual adjustment along the entire working length of the elevating mechanism, so that variations in the bushiness of a single beet top will not cause a loosening of the grip of the elevating mechanism upon successive or adjacent beet tops.

Further objects are to provide a beet harvester equipped with beet digging and elevating means or mechanism whereby the elevating and beet digging means may be simultaneously adjusted by a single manually controlled means, and may be locked in any one of a plurality of adjusted positions, and in which means are provided for varying the relative adjustment between the elevating means and the digging means.

Further objects are to provide a beet harvester in which a cradle is so related to the main frame of the harvester that the cradle is caused to execute parallel motion, that is to say, to assume a series of successive positions with reference to the main frame, and to maintain substantial parallelism between its parts and that of the main frame, so that a beet digger carried thereby may be caused to maintain its correct angular setting although its depth of cut or digging may be varied through wide limits.

An embodiment of the invention is shown in the accompanying drawings, in which:—

Figure 6 is a sectional elevation on the line 6—6 of Figure 2.

Figure 7 is an enlarged sectional view on the line 7—7 of Figure 1.

Figure 1:
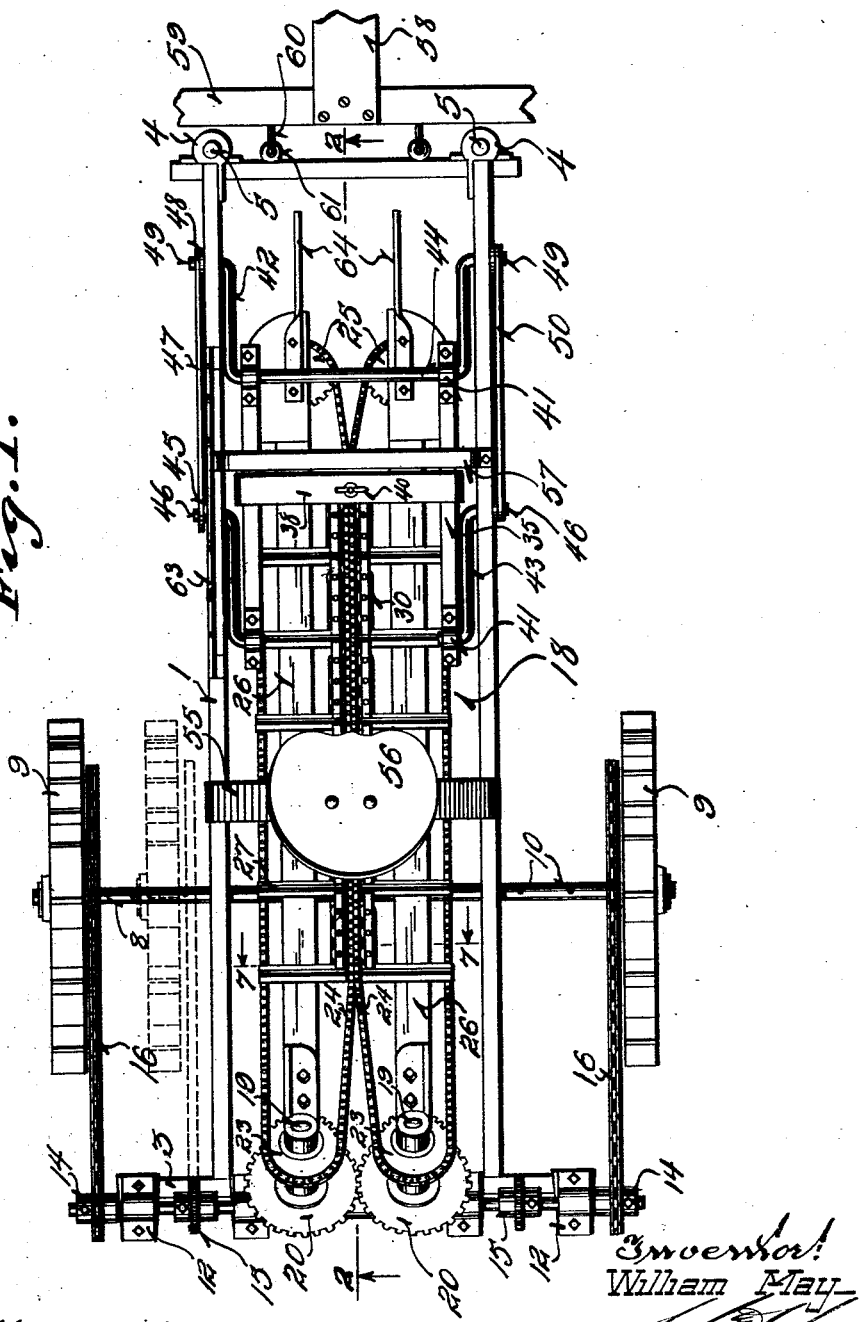
Figure 1 is a plan view of the harvester.

The machine comprises a main frame composed of side frames 1 preferably of channel iron joined by a forward member 2, and a rear member 3. The forward member may conveniently be joined to the side bars or side frames by means of brackets 4 which form supports for the vertical spindles 5 of forward caster like wheels 6. At a point spaced forwardly of the rear end of the side frames a pair of bearing brackets 7 extend downwardly and carry the transverse axle 8 of the rear wheels 9. These rear wheels are preferably provided with cleats to insure a firm grip upon the ground and, as may be seen from Figure 1, are adapted to occupy either the extreme position shown in full lines in Figure 1, upon the transverse axle 8, or to be moved inwardly, as may be seen in dotted lines for one of the wheels as shown in Figure 1. When they are moved inwardly suitable securing means may be employed to prevent their shifting on the axles, for instance cotter pins may be passed through the apertures 10 in the axle to retain the wheels in their adjusted positions. These wheels are each provided with a rigidly attached sprocket wheel 11 for a purpose hereinafter to appear.

The rear bar 3 carries a plurality of upstanding bearing brackets 12 (see Figures 2 and 3) which support an upper transverse driving shaft 13 for the beet elevating mechanism. This driving shaft 13 is provided with an outer pair of sprocket wheels 14 and an inner pair of sprocket wheels 15 adapted to be connected by means of the chains 16 with the sprocket wheels 11 upon the main wheels. The central pair of bearing brackets 12 are spaced apart and the rear portion 17 of the beet elevating mechanism, indicated generally at 18 in Figures 1 and 2, is positioned between such brackets and pivotally mounted upon the shaft 13, as clearly shown in Figures 2 and 3.

Vertical shafts 19 (see Figures 1 and 3) are carried by the portion 17 and are provided with intermeshing gears 20. One of such shafts is provided with a bevel gear 21 meshing with a bevel gear 22 carried by the transverse shaft 13. The upper portion of these vertical shafts 19 (see Figures 1, 2 and 3) carries sprocket wheels 23 which receive the elevating chains 24,—the other end of such chains being carried by forward sprocket wheels 25 (see Figure 1). A pair of forwardly extending bars 26 join the supports for the rear sprocket wheels 23 and the forward sprocket wheels 25, as shown in Figure 1. These bars are provided with U-shaped guides 27 at a plurality of points along their lengths, and as may be seen from Figure 7. The guides themselves are slidable inwardly and outwardly upon such bars 26. Each of these guides carries short supporting bars 29 between which a plurality of rollers 30 are pivotally mounted, such rollers being adapted to bear against the working stretches of the chains 24, as shown in Figures 1 and 7.

The bars 26 are provided with a plurality of sockets 31 within which the outer end of springs 32 are seated,—the inner ends of such springs bearing against the yoke portion of the guides 27 and urging the guides, together with the rollers 30 inwardly, thus forcing the working portions or stretches of the chains 24 towards each other. It is to be noted from Figure 7 that the guides 27 are provided with inwardly directed ledges 33 which support the working stretches of the chains and that their lower outwardly projecting arms support the idle or returning portions of the chains 24. The forward portions of the bars 26 are joined by a yoke 34 (see Figures 2 and 6) for a purpose hereinafter to appear.

Figure 2:
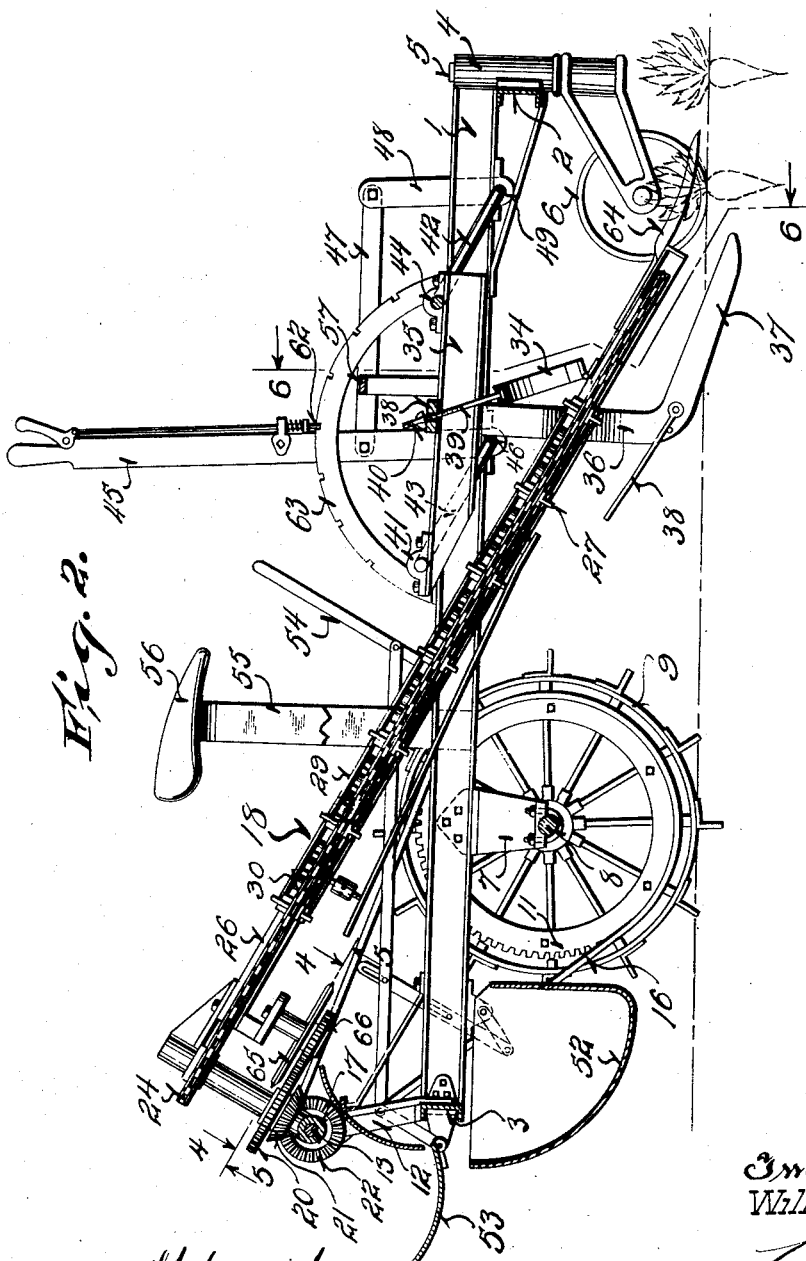
Figure 2 is a central vertical sectional view taken on the line 2—2 of Figure 1.
Figure 3:
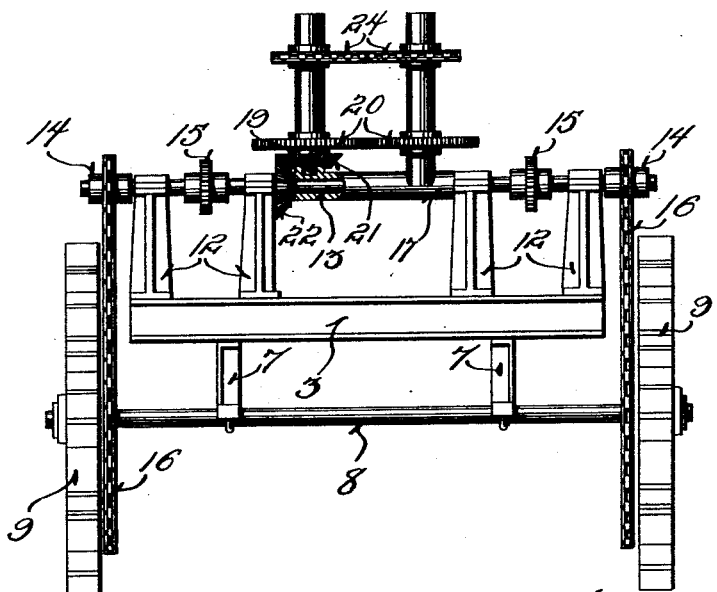
Figure 3 is a rear elevation with parts omitted for clearness.

A cradle is positioned between the main side frames 1 of the machine, as shown in Figures 1, 2 and 6, and is provided with relatively short side bars 35, which rigidly carry the beet diggers 36, such diggers extending downwardly, inwardly and forwardly and being provided with digging portions 37, as clearly shown in Figures 2 and 6. If desired, the diggers may be provided with a rearwardly projecting support 38 for the beets. The cradle is further provided with a transverse bar 38 through which a threaded pin 39 passes, an upper adjusting wing nut 40 being provided, as shown in Figures 2 and 6. This pin is joined to the yoke 34 and, from Figure 2, it will be noted that the lower arms of the yoke 34 are pivotally joined to the bars 26 of the elevating mechanism. This cradle is provided with bearings 41 (see Figures 1 and 6) which receive the upper arms of a pair of forward and rear crank arms or levers 42 and 43. As may be seen from Figure 1, the forward lever or crank arms are integrally joined by means of a transverse portion 44. One of the levers, for instance, one of the rear levers 43 is provided with a hand lever 45 rigidly attached to the lower crank arm 46 of such lever. This hand lever or adjusting lever is connected by means of a link 47 with a lever 48 rigidly attached to the lower arm 49 of one of the forward crank arms or levers 42 (as may be seen from Figures 1 and 2,) the other forward lever 42 has its lower arm 49 connected by means of link mechanism 50 with the lower arm 46 of the other rear lever 43, as may be seen from Figures 1, 2 and 6.

A beet receiving hopper 52 is pivotally carried adjacent the rear portion of the main frame, as shown in Figure 2, and a hopper or receiving portion 53 for the beet tops is also pivotally carried by the main frame and at a point preferably above the beet receiving hopper. These hoppers have been omitted from the remaining figures for the sake of clearness. They are adapted to be tipped by means of a hand lever 54 (see Figure 2) connected by suitable link mechanism with such hoppers.

The side bars 1 of the main frame are preferably provided with a U-shaped support 55 which carries a seat 56 at its upper portion and, if desired, a foot rest 57 (see Figure 2) may be provided forwardly of the seat.

The entire machine is adapted to be drawn across a field by any suitable means connected to a tongue 58. This tongue is preferably provided with a rear transverse bar 59 joined by suitable members 60 with eyeleted portions 61 carried by the forward transverse bar 2, as clearly shown in Figure 1.

Figure 4:
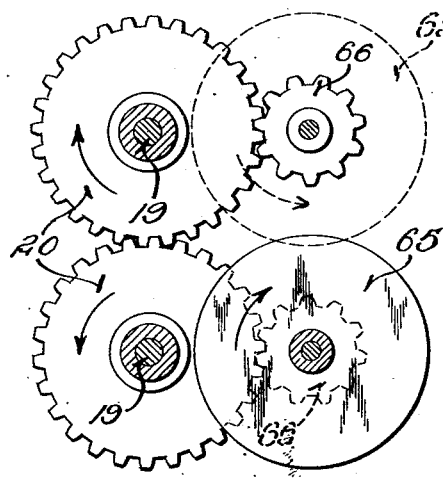
Figure 4 is a diagrammatic detail of the driving mechanism for the elevating means, such figure corresponding roughly to a section on the line 4—4 of Figure 2 and being drawn to an enlarged scale.
Figure 5:
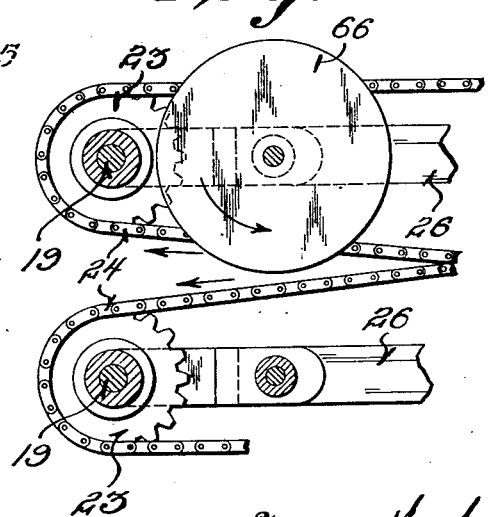
Figure 5 is a corresponding view taken on the line 5—5 of Figure 2.

The operation of the apparatus is as follows:— The diggers are lowered to operative position by manipulating the hand lever 45, such lever, of course, being provided with a manually controlled plunger 62 adapted to seat in any of several notches provided in a segmental lock portion 63, as shown in Figure 2. This rocking of the lever 45 causes the cradle, composed of the side bars 35, to assume any one of several parallel positions with reference to the main frame of the machine, and to thus maintain the diggers in their correct position although varying their elevation. After the requisite depth for the diggers has been ascertained, the exact relative adjustment of the elevating mechanism 18 may be most readily secured by adjusting the wing nut 40 (see Figure 2) thus accurately positioning the forward end of the elevating mechanism with reference to the diggers. If desired, the forward ends of this elevating mechanism may be provided with a pair of fingers 64, as shown in Figures 1 and 2, to gather up the beet tops as the beets are approached by the diggers. The beets are removed from the ground by the diggers and their tops are grasped between the working stretches of the elevating chains 24. The beets are then carried upwardly and rearwardly of the machine, the bars 29 adjusting themselves against the action of the springs sufficiently to permit this operation. Thereafter, the beet tops are severed by means of a pair of rotary cutters 65 (see Figure 2). These cutters 65 have superimposed portions and are driven by means of pinions 66 meshing with the gears 20 (see Figures 4 and 5) carried by the upstanding shafts 19 of the beet elevating mechanism.

The adjustable wheels 9 adapt the machine for traveling across fields provided with different spacing of beet rows so that the machine may be adjusted for one field and used until the entire work is completed. Thereafter, the chains 16 are opened and the wheels 9 slide inwardly. The chains 16 (see Figure 3) are again positioned with reference to the driving sprocket wheel, and with reference to the driven sprocket wheels 14 or 15.

It will be seen that a beet harvester has been provided which is equipped with means for accurately adjusting the relative position of the elevating and digging means, which is provided with manual control whereby the digging or elevating means may be raised or lowered to the desired position, and in which suitable cutters are associated with the beet elevating mechanism, so that they rock when such beet elevating mechanism is rocked and always maintain their correct relative position to such elevating mechanism.

Although the invention has been described in considerable detail, it is to be understood that the invention may be variously embodied and is, therefore, to be limited only as claimed.

I claim:—

1. A beet harvesting machine comprising a main frame supported by wheels, a cradle having parallel motion with reference to said frame and adapted to be raised and lowered, beet diggers carried by said cradle, beet elevating mechanism pivoted to the rear portion of said frame and extending downwardly and forwardly to a point adjacent said beet diggers, and means carried by said cradle for adjusting the elevating means relatively to said diggers.

2. A beet harvester comprising side frames supported by wheels, a cradle movable with reference to said side frame, beet diggers carried by said cradle, beet elevating means pivoted rearwardly of said frame, and top cutting means carried by said elevating means, and movable therewith.

3. A beet harvester comprising a main frame supported by wheels, a cradle movable with reference to said main frame, beet diggers carried by said cradle, beet elevating mechanism pivoted rearwardly of said frame and projecting forwardly to a point adjacent said diggers, means for adjusting the relative position of said cradle and elevating mechanism in all positions of said cradle, said elevating means including chains driven from upstanding shafts adjacent the pivotal support, and rotary cutters operatively coupled to said shafts.

4. A beet harvester comprising a main frame supported by wheels, a cradle movably carried by said main frame, manually controlled means for elevating said cradle and for rocking it into any one of several positions of adjustment, beet diggers rigidly carried by said cradle, beet elevating means pivotally mounted at the rear portion of said frame and extending forwardly to a point adjacent said diggers, and means connecting said cradle and the forward portion of said elevating means.

5. A beet harvester comprising a main frame, beet diggers supported therefrom, beet elevating mechanism extending upwardly from adjacent said diggers and having a pair of beet top engaging chains having parallel adjacent working stretches, a plurality of wholly independent bars positioned upon the outer side of each of such working stretches and bearing inwardly, a plurality of U-shaped guides for said bars, springs mounted between a portion of said guides and the ends of said bars, said guides having inwardly projecting ledges for supporting the working stretches of said chains.

6. A beet harvester comprising a main frame, beet diggers supported therefrom, beet elevating mechanism extending upwardly from adjacent said diggers and having a pair of beet top engaging chains having parallel adjacent working stretches, a plurality of wholly independent bars positioned upon the outer side of each of such working stretches and bearing inwardly, a plurality of U-shaped guides for said bars, springs mounted between a portion of said guides and the ends of said bars, said U-shaped guides having inwardly and outwardly projecting portions for supporting the working and idle stretches of said chains.

In testimony that I claim the foregoing I have hereunto set my hand at Belgium, in the county of Ozaukee and State of Wisconsin.

WILLIAM MAY.